United States Patent
Westergaard (10) Patent No.: US 7,988,416 B2
(45) Date of Patent: Aug. 2, 2011

(54) WIND TURBINE BLADE WITH DAMPING ELEMENT

(75) Inventor: Carsten Hein Westergaard, Houston, TX (US)

(73) Assignee: Vestas Wind Systems A/S, Randers SV (DK)

( * ) Notice: Subject to any disclaimer, the term of this patent is extended or adjusted under 35 U.S.C. 154(b) by 392 days.

(21) Appl. No.: 12/406,202

(22) Filed: Mar. 18, 2009

(65) Prior Publication Data

US 2010/0239426 A1    Sep. 23, 2010

(51) Int. Cl.
*F01D 5/18* (2006.01)

(52) U.S. Cl. ....... 416/79; 416/119; 416/145; 416/229 R; 416/241 R; 416/500

(58) Field of Classification Search ............ 416/79, 416/119, 144, 145, 229 R, 241 R, 249 A, 416/500
See application file for complete search history.

(56) References Cited

U.S. PATENT DOCUMENTS

| | | | |
|---|---|---|---|
| 6,626,642 B1 * | 9/2003 | Veldkamp | 416/79 |
| 6,672,837 B1 * | 1/2004 | Veldkamp et al. | 416/144 |
| 2008/0107540 A1 * | 5/2008 | Bonnet | 416/229 R |
| 2010/0021303 A1 * | 1/2010 | Nielsen et al. | 416/145 |

FOREIGN PATENT DOCUMENTS

| | | |
|---|---|---|
| WO | WO9521327 | 8/1995 |
| WO | WO9932289 | 7/1999 |
| WO | WO9943955 | 9/1999 |
| WO | WO0006898 | 2/2000 |
| WO | 0198653 A1 | 12/2001 |
| WO | WO03062637 | 7/2003 |
| WO | WO2007051465 | 5/2007 |
| WO | WO2008040347 | 4/2008 |
| WO | WO2008067814 | 6/2008 |
| WO | WO2008119352 | 10/2008 |

OTHER PUBLICATIONS

Marcin Krol; International Search Report and Written Opinion issued in related International Application No. PCT/US2010/026198; Apr. 21, 2011; 8 pages; European Patent Office.

* cited by examiner

*Primary Examiner* — Michael Lebentritt
(74) *Attorney, Agent, or Firm* — Wood, Herron & Evans, L.L.P.

(57) ABSTRACT

A blade for a wind turbine generally comprises a shell body defined by first and second shells extending between a leading edge and a trailing edge, an inner spar supporting at least a portion of the shell body, and a damping element coupled to at least one of the shell body or inner spar. The damping element is configured to move relative to the shell body to dissipate vibrations of the blade, and has a greater degree of freedom in a flapwise direction between the first and second shells than in an edgewise direction between the leading and trailing edges.

18 Claims, 6 Drawing Sheets

WIND TURBINE BLADE WITH DAMPING ELEMENT

TECHNICAL FIELD

The present invention relates to damping the vibrations of a wind turbine blade. More specifically, the present invention relates to an element for damping the edgewise vibrations of a wind turbine blade, a wind turbine blade including said element, and a method for damping edgewise vibrations with said element.

BACKGROUND

There are two primary types of natural vibrations (i.e., resonant oscillations) associated with the blade of a wind turbine. Flapwise vibrations occur in a plane perpendicular to leading and trailing edges of the blade. Edgewise vibrations occur in a plane through the leading and trailing edges. Both types of vibrations place significant loads on the blade that can intensify fatigue damage and lead to failure. Therefore, it is important to avoid exciting these vibrations.

This is particularly true when a blade enters an operational condition called stall. During stall, the airflow over the upper surface of the blade becomes increasingly turbulent. If turbulence or other factors excite the blade's natural vibrations, aerodynamic forces tend amplify these movements. This occurs because of a principle called negative aerodynamic damping.

There is a high risk of damage in the situation described above, especially in stalled-controlled turbines where stall is intentionally used to control power output. Specifically, the aerodynamic forces that excite natural vibrations during operation are a function of the blade's tip speed squared. These forces are significant during stall because that condition occurs at relatively high wind speeds.

Pitch-controlled turbines do not experience the situation described above as much as stalled-controlled turbines. This is because the blades of a pitch-controlled turbine can be pitched to change the aerodynamics when negative aerodynamic damping is detected. Nevertheless, the situation may still occur for a brief period of time. The blades of a pitch-controlled turbine may also experience the amplification of natural vibrations when "parked" during a storm with extremely high winds. In such a situation, however, the aerodynamic forces exciting the natural vibrations of the blade are a function of the wind speed squared.

There are two main principles that counteract negative aerodynamic damping: 1) another aerodynamic principle known as dynamic stall, and 2) structural damping. Although dynamic stall plays an important role in reducing flapwise vibrations, it is only slightly effective in reducing edgewise vibrations. Therefore, the primary factor in preventing edgewise vibrations is a blade's structural damping.

Several ways to increase the damping of a structural blade have been developed. For example, WO 95/21327 discloses a blade having an oscillation-reduction element oriented in the direction of unwanted oscillations. Although the patent application first describes the oscillation-reduction element using generic terms and depicts it using conventional symbols, most of the embodiments disclosed are tuned liquid dampers. These dampers are specifically designed (i.e., "tuned") to have a natural frequency substantially corresponding to the dominating natural frequency of the blade. As such, their effectiveness at damping vibrations is frequency-dependent. They also typically require maintenance and can be difficult to access and install.

Passive dampers are also known. One example of a passive damper is disclosed in WO 99/43955. However, because passive dampers are typically difficult to design and implement, the number of adequate solutions developed has been limited. There remains plenty of room for improvement in this area.

SUMMARY

A blade for a wind turbine is provided by the disclosure below. The blade generally comprises a shell body, an inner spar supporting at least a portion of the shell body, and a damping element coupled to at least one of the shell body or inner spar (the damping element could be coupled the shell body and/or the inner spar). The shell body is defined by first and second shells extending between a leading edge and a trailing edge. The damping element is configured to move relative to the shell body to dissipate vibrations of the blade. Additionally, the damping element has a greater degree of freedom in a flapwise direction between the first and second shells than in an edgewise direction between the leading and trailing edges.

Different embodiments of the damping element are disclosed as examples. The term "damping means" refers to some or all of these embodiments, together with equivalents to such embodiments. The damping element may comprise, for example, a first portion coupled to the shell body and/or inner spar, a second portion coupled to the shell body and/or inner spar, and a joint material coupling the first portion to the second portion. The joint material has a stiffness less than the first and second portions but a damping capacity greater than the first and second portions.

There may be a single damping element in the blade or a plurality of damping elements coupled to the blade. Additionally, the damping element may be at least partially formed with the blade or separately attached thereto. As such, the disclosure below provides a stand-alone damping element in addition to a wind turbine blade incorporating such an element. The stand-alone damping element may comprise a box configured to be coupled to the inner spar and move relative to the shell body to dissipate vibrations of the blade. The box, like all damping elements described below, has a greater degree of freedom in a flapwise direction between the first and second shells than in an edgewise direction between the leading and trailing edges.

Finally, a wind turbine incorporating the blade and damping element is also provided, along with a method of dissipating edgewise vibrations in the blade of such a wind turbine. Thus, the method involves operating the wind turbine so that the blade experiences edgewise vibrations. In response, the damping element moves relative to the shell body primarily in the flapwise direction to dampen the edgewise vibrations. The term "primarily" in this context is related to the degree of freedom of the damping element; the relative movement is greater in the flapwise direction than in the edgewise direction.

These and other aspects will be made more apparent by the detailed description and claims below, as well as by accompanying drawings. Note that when describing the same type of elements, numerical adjectives such as "first" and "second" are merely used for clarity. They are assigned arbitrarily and may be interchanged. As such, the use of these adjectives in the claims may or may not correspond to the use of the same adjectives in the detailed description (e.g., a "first element" in the claims might refer to any such "element" and not necessarily the ones labeled "first" in the detailed description below).

DETAILED DESCRIPTION

Figure 1:
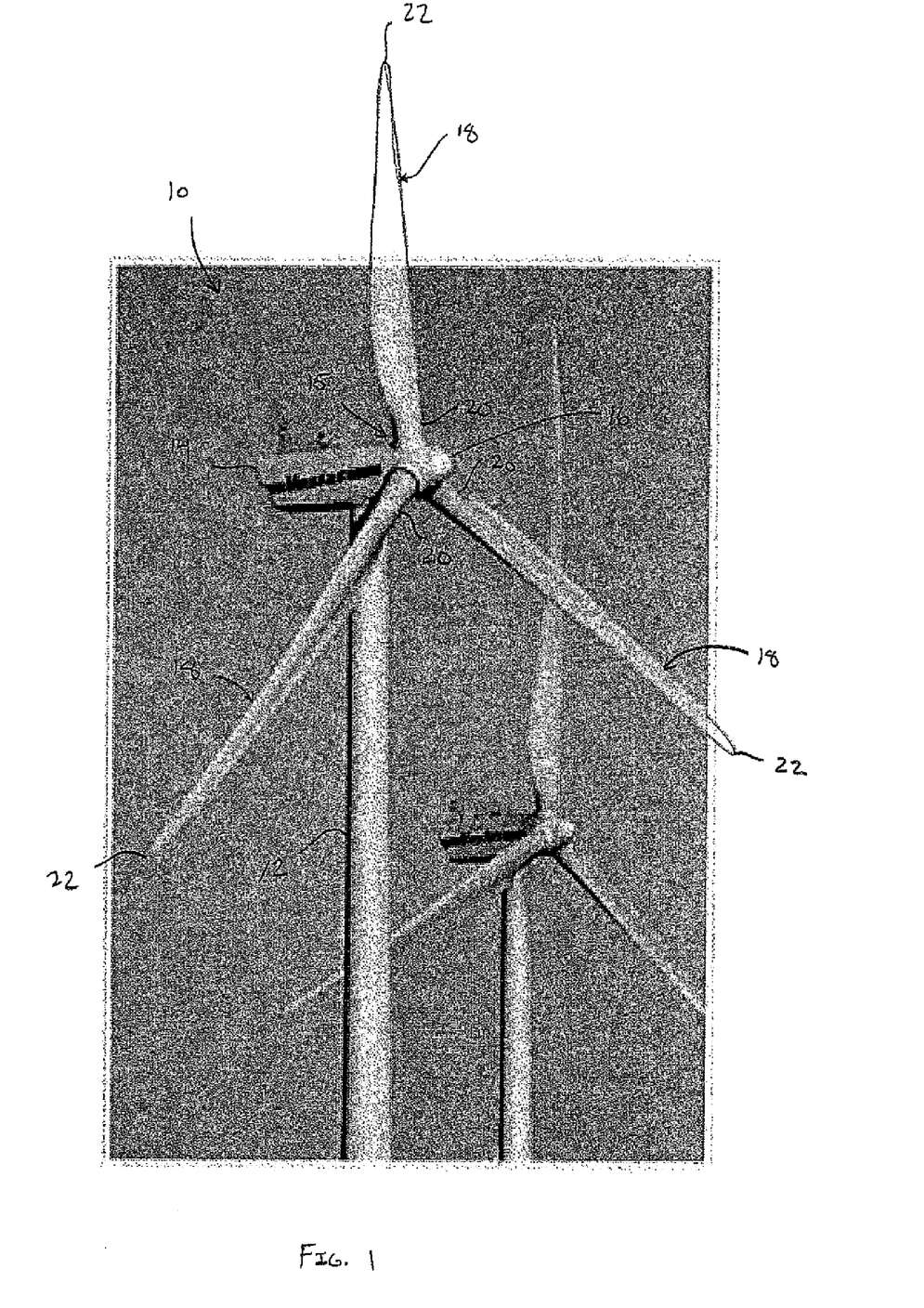
FIG. 1 is a perspective view of one embodiment of a wind turbine.

FIG. 1 shows one embodiment of a wind turbine 10. The wind turbine generally comprises a tower 12, a nacelle 14 supported by the tower 12, and a rotor 15 attached to the nacelle 14. The rotor 15 includes a hub 16 rotatably mounted to the nacelle 14 and a set of blades 18 coupled to the hub 16. More specifically, each blade 18 includes a root 20 coupled to the hub 16 and a tip 22 spaced from the hub 16. The blades 18 convert the kinetic energy of the wind into mechanical energy used to rotate the shaft of a generator (not shown), as is conventional. However, as will be described in greater detail below, one or more of the blades 18 are specially designed to reduce certain vibrations that create loads and increase the potential of damage or failure.

Figure 2:
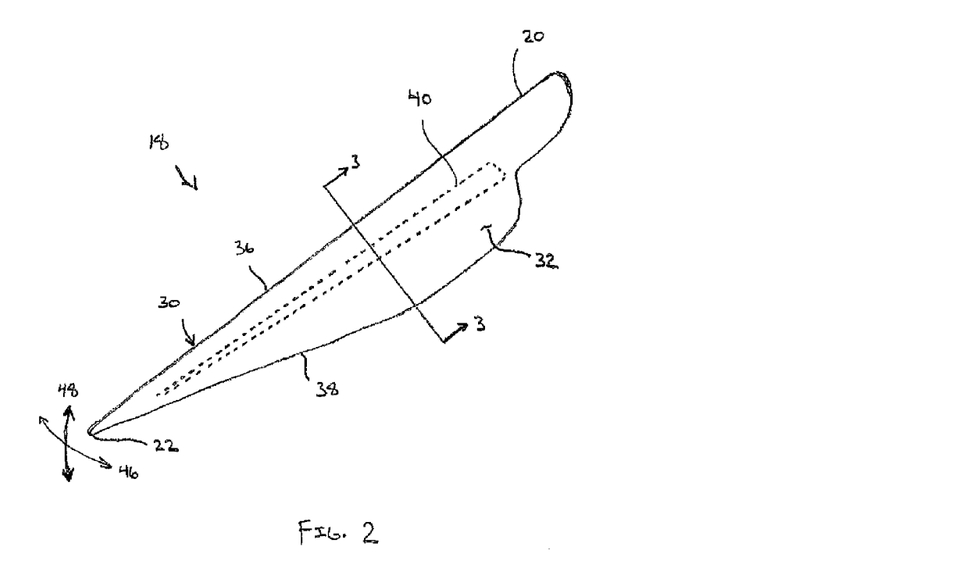
FIG. 2 is a perspective view of a blade on the wind turbine of FIG. 1.
Figure 3:
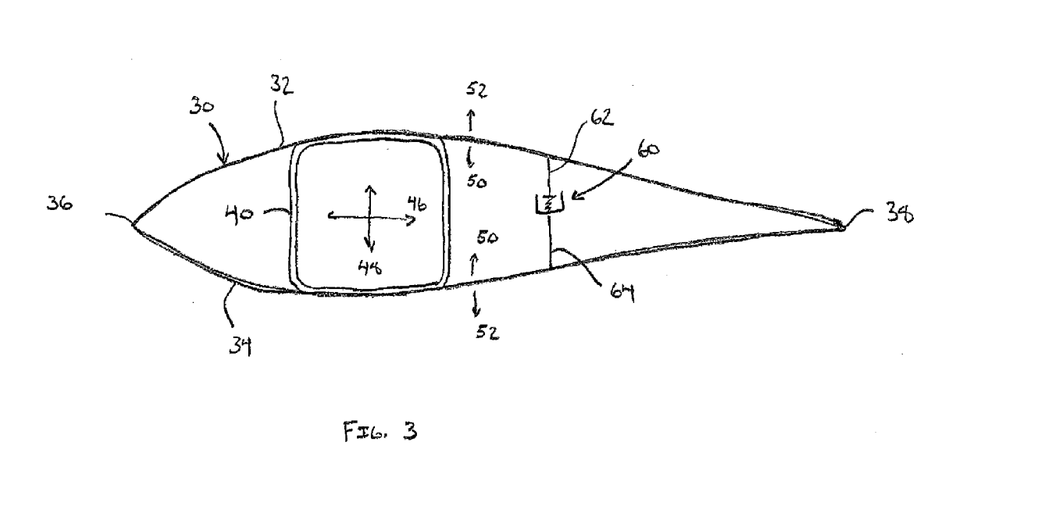
FIG. 3 is a sectional view taken along line in FIG. 2

FIGS. 2 and 3 schematically illustrate one of the blades 18 in further detail. The blade 18 includes a shell body 30 defined by first and second shells 32, 34 extending between a leading edge 36 and a trailing edge 38 and forming an airfoil cross-section. An inner spar 40 extends from the root 20 toward the tip 22 between the first and second shells 32, 34 to support at least a portion of the shell body 30. The blade 18 may be constructed using any materials and techniques suitable for wind turbines. For example, the first and second shells 32, 34 may be constructed by laying materials in a mold and curing resin. The resin may be pre-impregnated in the materials (e.g., pre-preg glass fibers) and/or introduced separately (e.g., using an infusion process), depending on the technique used.

Certain conditions may cause the blade 18 to experience vibrations in the plane of its rotation. The tip 22 moves back and forth in an edgewise direction 46 between the leading and trailing edges 36, 38 during these vibrations. The blade 18 may also experience vibrations a flapwise direction 48, where the tip 22 moves perpendicular to the plane of rotation.

Attempts to dampen edgewise vibrations have focused on applying forces in the opposite direction of movement of the tip 22 (i.e., the edgewise direction 46). However, applicant has discovered that the geometry of the blade 18 allows edgewise vibrations to be dampened by applying forces in a different manner. More specifically, when the tip 22 moves in the edgewise direction 46 toward the leading edge 36, the first and second shells 32, 34 tend to flex inwards and outwards because of the airfoil shape and connection between the root 20 and the hub 16. Arrows 50, 52 in FIG. 3 represent the flexing movement experienced during edgewise vibrations.

To this end, the blade 18 further includes a damping element 60 configured move relative to the blade 18 primarily in the flapwise direction 48 to dissipate the edgewise vibrations. The damping element 60 is shown schematically in FIG. 3 using conventional symbols for dampers. It is oriented within the shell body 30 such that it has greater degree of freedom in the flapwise direction 48 than the edgewise direction 46. Although those skilled in the art will appreciate that there are different ways of constructing the damping element 60, several examples are described below to illustrate these principles.

Indeed, the orientation of the damping element 60 may be achieved as shown in FIG. 3, with the damping element 60 having a first portion 62 coupled to the first shell 32 and a second portion 64 coupled to the second shell 34. The first and second portions 62, 64 are configured to move relative to each other during the flexing of the shell body 30 discussed above. Forces to counteract this movement (and, therefore, the edgewise vibrations) may be created by frictional contact between the first and second portions 62, 64. Alternatively or additionally, the damping element 60 may further include a joint material 66 (FIG. 4) coupling the first portion 62 to the second portion 64.

Figure 4:
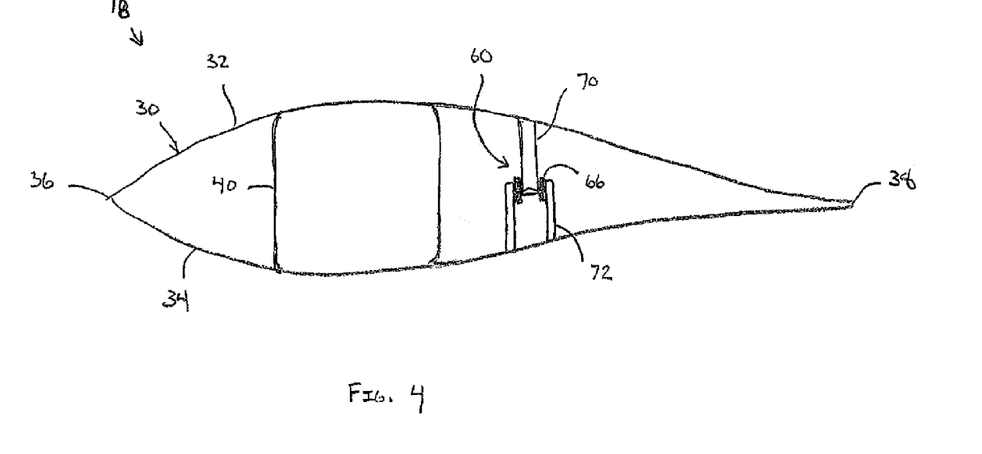
FIG. 4 is a sectional view similar to FIG. 3 showing one example of a damping element.

For example, FIG. 4 illustrates an embodiment where the first portion 62 is a first cylindrical element 70 and the second portion 64 is a second cylindrical element 72. The first and second cylindrical elements 70, 72 may be formed when the respective first and second shells 32, 34 are molded. Alternatively, the first and second cylindrical elements 70, 72 may be formed separately and attached to the respective first and second shells 32, 34 before they are glued or otherwise assembled to define the shell body 30. One of the first and second cylindrical elements 70, 72 is configured to at least partially receive the other in a telescopic manner. In FIG. 4, the second cylindrical element 72 is hollow and configured to receive the first cylindrical element 70, which may or may not be hollow.

The first and second cylindrical elements 70, 72 may be constructed from composite fibers, hard plastics, metals, or other relatively stiff materials. The joint material 66, which is located circumferentially between the first and second cylindrical elements 70, 72, has a stiffness less than that of the first and second cylindrical elements 70, 72 but a damping capacity (energy dissipated per cycle of stress) greater than the first and second cylindrical elements 70, 72. Examples of such a material include, without limitation: rubber (including foamed rubber and rubber reinforced with fibers), epoxy resins (including those mixed with nano-fibers or Kevlar®), and various thermoplastics. The joint material 66 may simply be applied to (e.g., coated on) the first and/or second cylindrical elements 70, 72, or be formed as a separate cylindrical component glued or otherwise attached to the first and/or second cylindrical elements 70, 72.

Figure 5:
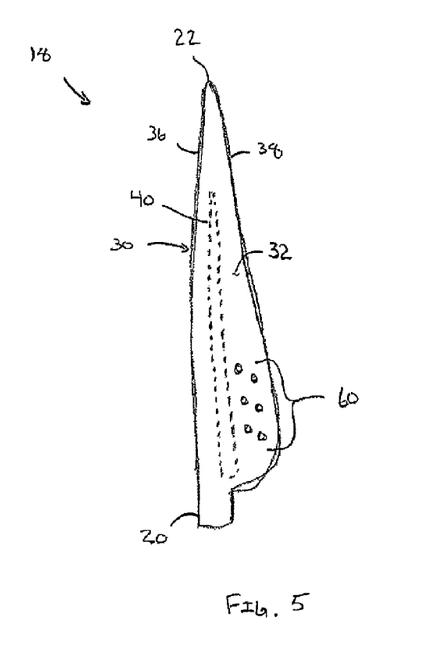
FIG. 5 is a top plan view of a blade having several of the damping elements of FIG. 4.

The number and location of damping elements 60 within the shell body may vary. FIG. 5 illustrates several of the damping elements 60 according to the embodiment of FIG. 4 being located close to the root 20 of the blade 18. The damping elements 60 may be strategically positioned in locations where they will not only be effective at damping edgewise vibrations, but also at providing additional support to the shell body 30 where it is needed. The damping elements 60 may also be positioned in locations where they are easier to construct or install.

Figure 6:
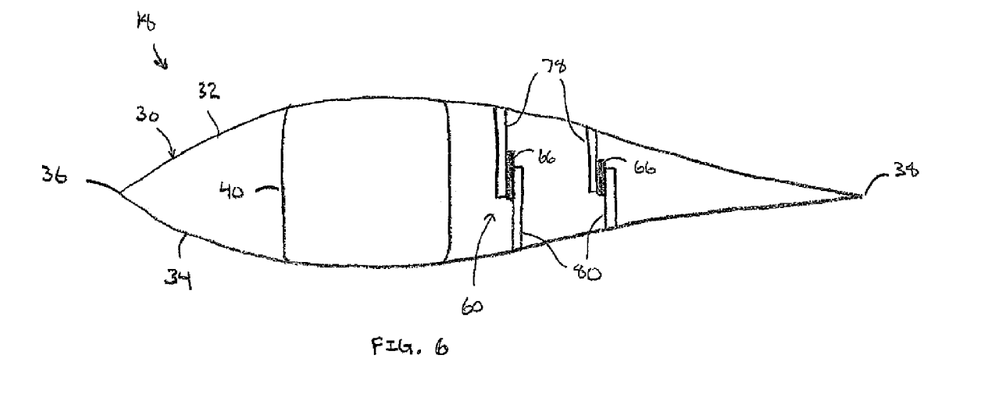
FIG. 6 is a sectional view similar to FIG. 3 showing another example of a damping element.
Figure 7A:
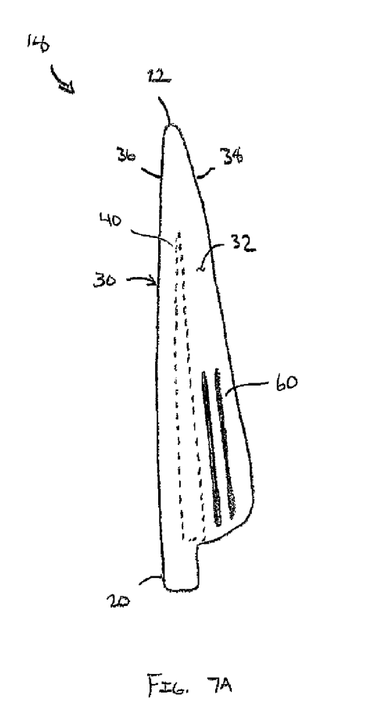
FIGS. 7A and 7B are top plan views of blades with different arrangements of the damping elements of FIG. 6.
Figure 7B:
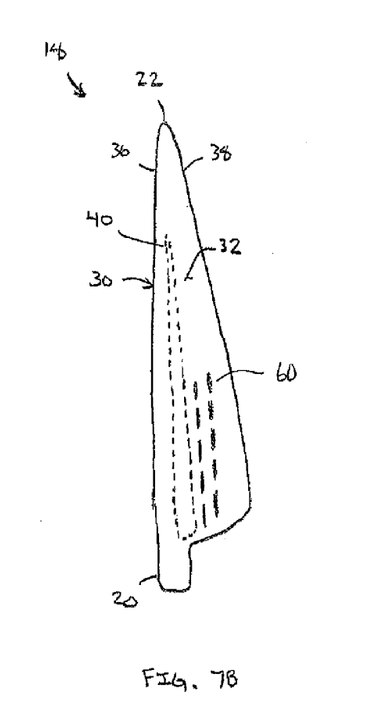

FIG. 6 illustrates an embodiment where the first portion 62 (FIG. 3) of the damping element 60 is a first plate 78 and the second portion 64 is a second plate 80. The first and second plates 78, 80 are analogous to the first and second cylindrical elements 70, 72 and may be formed using similar techniques. However, because the first and second plates 78, 80 are substantially flat, they may extend along the length of the blade 18. FIG. 7A shows a variation where several of these damping elements 60 are elongated and extend in a direction from the root 20 towards the tip 22. FIG. 7B shows a variation where these damping elements 60 extend along smaller lengths of the blade 18 in a direction from the root 20 towards the tip 22. This latter variation may help reduces loads on the blade 18 unintentionally created by shear between the first and second plates 78, 80 when the blade vibrates in the flapwise direction. Although not shown, the first and second plates 78, 80 may alternatively be oriented to extend in the edgewise direction 46 (FIG. 2) between the inner spar 40 and the trailing edge 38.

The joint material 66 is located between the first and second plates 78, 80 and serves the same function as in the previous embodiment. Thus, the joint material 66 may simply be applied to (e.g., coated on) the first and/or second plates 78, 80, or be formed as a separate sheet glued or otherwise attached to the first and/or second plates 78, 80.

Figure 8:
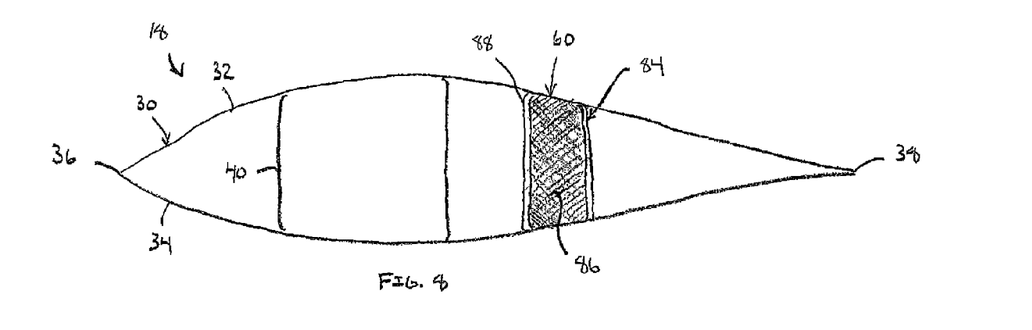
FIG. 8 is a sectional view similar to FIG. 3 showing yet another example of a damping element.

With reference to FIG. 8, a further example of the damping element 60 is shown. The damping element 60 is in the form of an additional spar or support 84 extending from the first shell 32 to the second shell 34 between the inner spar 40 and trailing edge 38. Advantageously, the damping element 60 includes a material 86 with relatively high damping capacity, such as fiber-reinforced rubber. The material 86 may be surrounded on one or more sides by a shell 88 constructed from fiberglass or another material that provides some structural support. This type of damping element 60 may be provided as a separate component that is coupled to the first and second shells 32, 34 by glue or the like during the manufacturing process of the blade 18.

Figure 9:
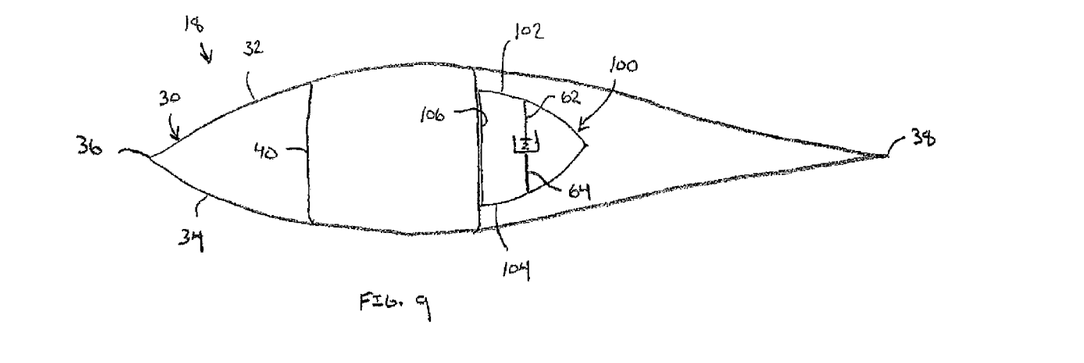
FIG. 9 is a sectional view similar to FIG. 3 showing a further example of a damping element.

The embodiments discussed above involve coupling the damping element 60 to the shell body 30. However, it is also possible to couple the damping element 60 to the inner spar 40 and still achieve a greater degree of freedom in the flapwise direction 48 (FIG. 2) than in the edgewise direction 46. For example, FIG. 9 illustrates an embodiment where a damping element 100 comprises first and second surfaces 102, 104 extending in a direction away from the inner spar 40 and towards the trailing edge 38. The first and second surfaces 102, 104 are spaced apart at the inner spar 40 but joined at a location away from it. Such an arrangement defines an inner shell or box within the shell body 30. The inner spar 40 itself, or a third surface 106 of the damping element 100 extending between the first and second surfaces 102, 104, forms part of the box with the first and second surfaces 102, 104. The third surface 106 may be desired if the damping element 100 is a stand-alone component attached to the inner spar 40, as will be described in greater detail below.

By defining a box or "shell-within-a-shell", the first and second surfaces 102, 104 are able to simulate some of the movements of the first and second shells 32, 34 when the blade 18 experiences edgewise vibrations. In particular, the first and second surfaces 102, 104 may be designed to flex toward and away from each other like the first and second shells 32, 34 (see discussion of FIG. 3 above). This allows the components of the damping element 100 that dissipate these movements (and, therefore, the edgewise vibrations) to be coupled to the first and second surfaces 102, 104 rather than the first and second shells 32, 34. These components are shown schematically in FIG. 9 using the same symbols shown in FIG. 3. Accordingly, the same reference numbers will be used where appropriate.

The damping element 100 is still oriented such that it has greater degree of freedom in the flapwise direction 48 (FIG. 2) than in the edgewise direction 46. Again, those skilled in the art will appreciate that there are different ways of constructing the damping element 100 with this orientation. Indeed, the damping element 100 may be constructed similar to any of the embodiments discussed above.

FIG. 9 shows an embodiment where the first portion 62 of the damping element 100 is coupled to the first surface 102 and the second portion 64 is coupled to the second surface 104. The first and second portions 62, 64 are still configured to move relative to each other, like in FIG. 3, but this time as a result of the flexing of the first and second surfaces 102, 104 rather than the shell body 30. In both FIGS. 3 and 9, however, the flexing movement is caused by the same forces acting on the blade 18. And once again, forces to counteract the movement may be created by frictional contact between the first and second portions 62, 64, a joint material coupling the first portion 62 to the second portion 64, or other techniques. The first and second portions 62, 64 may be cylindrical elements like the embodiment of FIG. 4, plate-like elements like the embodiment of FIG. 6, or have some other shape. Additionally, it will be appreciated that the number, size, and arrangement of damping elements 100 may still vary.

Placing components of the damping element 100 within the box defined by the first and second surfaces 102, 104 offers several advantages. For example, both the first and second surfaces 102, 104 may be made convex (as shown). This geometry may cause the first and second surfaces 102, 104 to flex more than the first and second shells 32, 34 during edgewise vibrations, thereby providing the damping element 100 with a greater opportunity to dissipate the vibrations. The flexing may also be more symmetrical, thereby making it easier to design and arrange the components of the damping element 100 (e.g., the first and second portions 62, 64).

Furthermore, associating the damping element 100 with the inner spar 40 enables the design and manufacture of the first and second shells 32, 34 to be optimized without having to take into account the attachment of the damping element 100. Loads created by the damping element 100 are transferred to the inner spar 40 rather than the shell body 30. Coupling the damping element 100 along the inner spar 40 may help also increase the overall stiffness of the blade 18. As a result, thinner blade designs may be possible.

Figure 10:
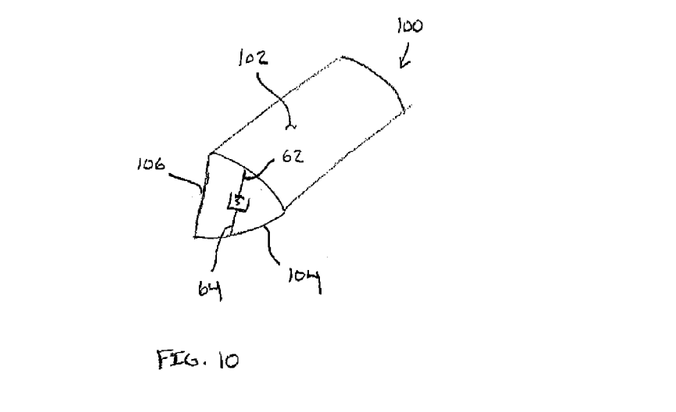
FIG. 10 is a perspective view of a stand-alone embodiment of the damping element of FIG. 9.

Additional advantages may be achieved by providing the damping element 100 as a stand-alone component, as shown in FIG. 10. Such an embodiment may include the third surface 106 to facilitate coupling the damping element 100 to the inner spar 40. For example, during the manufacturing process of the blade 18, the damping element 100 may be coupled to the inner spar 40 by gluing the third surface 106 thereto. This may be done before positioning the inner spar 40 relative to the first shell 32 or second shell 34, or just prior to closing the mould (not shown) that assembles the first and second shells 32, 34 together on opposite sides of the inner spar 40. The length of the damping element 100 may vary such that there may be one long damping element 100 or a plurality of damping elements 100 coupled to the inner spar 40.

Figure 11:
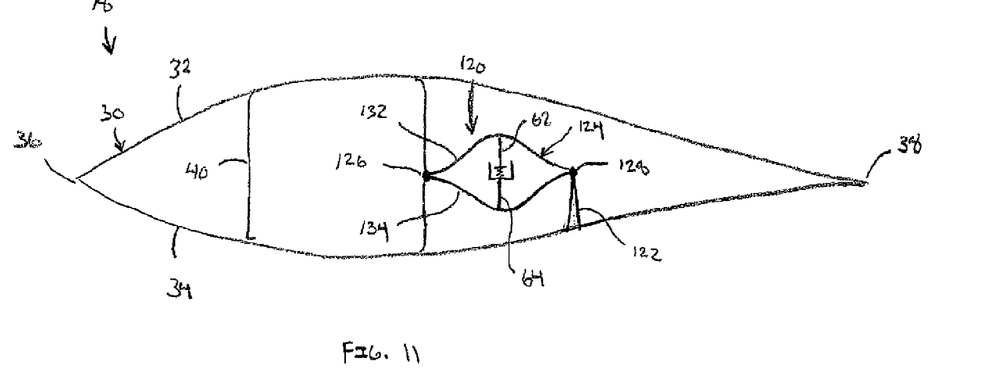
FIG. 11 is a sectional view similar to FIG. 3 showing a further example of a damping element.

FIG. 11 illustrates an embodiment where a damping element 120 is coupled to both the inner spar 40 and shell body 30, yet still has a greater degree of freedom in the flapwise direction 48 (FIG. 2) than in the edgewise direction 46. The damping element 120 includes a support 122 coupled to the second shell 34 and extending toward the first shell 32, although the support 122 may alternatively or additionally be coupled to the first shell 32. A box 124 is coupled to the inner spar 40 at a first joint 126 and to the support 122 at a second joint 128 (the first and second joints 126, 128 are shown schematically). The box 124 has a thickness between the inner spar 40 and the support 122 that converges at the first and second joints 126, 128. Thus, the thickest part of the box 124 is located between the first and second joints 126, 128 (and, therefore, between the inner spar 40 and support 122).

Similar to the previous embodiment, such an arrangement enables surfaces of the box 124 to simulate some of the movements of the first and second shells 32, 34 when the blade 18 experiences edgewise vibrations. More specifically, an outer surface 132 of the box 124 facing the first shell 32 and an outer surface 134 facing the second shell 34 may flex toward and away from each other like the first and second shells 32, 34 (see discussion of FIG. 3 above). So again, the components of the damping element 120 that dissipate these movements need not be coupled directly to the first and second shells 32, 34. The components are shown schematically in FIG. 11 using the same symbols shown in FIG. 3 and, where appropriate, the same reference numbers. This arrangement advantageously limits the loads created on surrounding structures (e.g., the shell body 30).

The damping element 120 may be constructed similar to any of the embodiments above. Thus, the damping element 120 may include the first and second portions 62, 64 coupled to the outer surfaces 132, 134, respectively, with the first and second portions 62, 64 being cylindrical elements, plate-like elements, or elements having some other shape. As with the other embodiments, other arrangements are possible that result in the damping element having the orientation described above.

Figure 12:
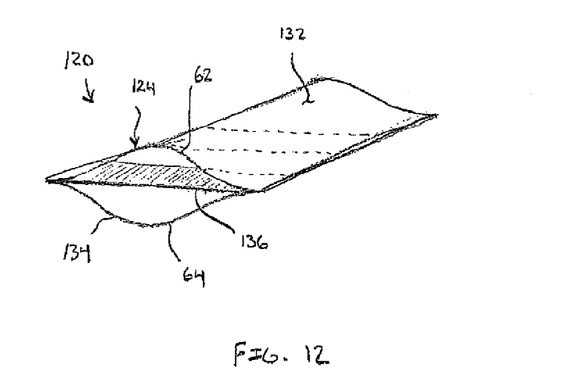
FIG. 12 is a perspective view of an embodiment of the damping element of FIG. 11.

FIG. 12 illustrates an embodiment of the box 124 where the first portion 62 is coupled to the first and second joints 126, 128 (FIG. 11) and includes the outer surface 132, and the second portion 64 is coupled to the first and second joints 126, 128 and includes the outer surface 134. To this end, the first and second portions 62, 64 represent clam-like halves or "half-shells" of the box 124. They may be constructed from glass fibers or another relatively stiff material. The damping element 120 in this embodiment also includes a third portion 136 coupling the first portion 62 to the second portion 64 between the first and second joints 126, 128. The third portion 136 may be a sheet or plate formed from the joint material discussed above, with the joint material having a stiffness less than the first and second portions 62, 64 but a damping capacity greater than the first and second portions 62, 64. Alternatively, the third portion 136 may be one or more wires or cables (not shown) tensioned to maintain the claim-like shape of the box 124.

The box 124 is shown as having a length in FIG. 12. Similar to the stand-alone damping element 100 in FIG. 10, those skilled in the art will appreciate that this length may vary. There may be one relatively long box 124 in the blade 128, or there may be a plurality of damping elements 120 spaced along the blade 18 and each comprising boxes 124 with relatively short lengths. Additionally, the plate-like third portion 136 extending between the first and second joints 126, 128 may be coextensive with the first and second portions 62, 64 or have a different length. FIG. 12 shows multiple third portions 136 being spaced apart within the box 124. The spaces between may be filled with a material having excellent damping properties (i.e., a relatively high damping capacity).

The embodiments described above are merely examples of the invention defined by the claims that appear below. Those skilled in the art will appreciate additional examples, modifications, and advantages based on the description. For example, the embodiments where the damping element 60 is coupled to the shell body 30 may not include the inner spar 40. The blade 18 may instead be designed such that the shell body 30 provides sufficient load-bearing support. Additionally, those skilled in the art will appreciate that individual features of the various embodiments may be combined in different ways. Accordingly, departures may be made from the details of this disclosure without departing from the scope or spirit of the general inventive concept.

The invention claimed is:

1. A blade for a wind turbine, comprising:
   a shell body defined by first and second shells extending between a leading edge and a trailing edge;
   an inner spar supporting at least a portion of the shell body; and
   a damping element coupled to at least one of the shell body or inner spar, the damping element being configured to move relative to the shell body to dissipate vibrations of the blade, and the damping element having a greater degree of freedom in a flapwise direction between the first and second shells than in an edgewise direction between the leading and trailing edges.

2. A blade according to claim 1, comprising:
   a first portion coupled to said shell body or inner spar;
   a second portion coupled to said shell body or inner spar, and
   a joint material coupling the first portion to the second portion, the joint material having a stiffness less than the first and second portions but a damping capacity greater than the first and second portions.

3. A blade according to claim 1, wherein the damping element comprises:
   a first portion coupled to the first shell; and
   a second portion coupled to the second shell, the first and second portions being configured to move relative to each other and to contact each other during said movement.

4. A blade according to claim 3, wherein the first portion of the damping element comprises a first cylindrical element and the second portion of the damping element comprises a second cylindrical element, and wherein the first cylindrical element is at least partially hollow and configured to at least partially receive the second cylindrical element.

5. A blade according to claim 3, wherein the first portion of the damping element comprises a first plate and the second portion of the damping element comprises a second plate.

6. A blade according to claim 1, wherein the damping element is coupled to the inner spar and comprises first and second surfaces extending in a direction away from the inner spar and toward the trailing edge, the first and second surfaces being spaced apart at the inner spar but joined at a location away from the inner spar to define a box.

7. A blade according to claim 6, wherein the damping element further comprises a third surface extending between the first and second surfaces to define a side of the box, the third surface being coupled to the inner spar.

8. A blade according to claim 6, wherein the first and second surfaces of the box are convex.

9. A blade according to claim 6, wherein at least some of the box is filled with a joint material coupled to both the first and second surfaces, the joint material having a stiffness less than the first and second surfaces but a damping capacity greater than the first and second surfaces.

10. A blade according to claim 1, wherein the damping element comprises:

a support coupled to the first shell and extending toward the second shell; and a box coupled to the inner spar at a first joint and to the support at a second joint, the box having a thickness between the inner spar and the support that converges at the first and second joints.

11. A blade according to claim 10, wherein the box comprises:

a first portion coupled to the first and second joints and including an outer surface facing the first shell;

a second portion coupled to the first and second joints and including an outer surface facing the second shell; and a third portion coupling the first portion to the second portion between the first and second joints, the third portion being formed by a material having a stiffness less than the first and second portions but a damping capacity greater than the first and second portions.

12. A blade according to claim 1, further comprising:

a plurality of said damping elements each coupled to at least one of the shell body or inner spar.

13. A wind turbine, comprising:

a tower;

a nacelle supported by the tower; and a rotor including a hub rotatably coupled to the nacelle and a blade coupled to the hub, the blade comprising:

a shell body defined by first and second shells extending between a leading edge and a trailing edge;

an inner spar supporting at least a portion of the shell body; and a damping element coupled to at least one of the shell body or inner spar, the damping element being configured to move relative to the shell body to dissipate vibrations of the blade, and the damping element having a greater degree of freedom in a flapwise direction between the first and second shells than in an edgewise direction between the leading and trailing edges.

14. A damping element for a blade of a wind turbine, the blade having a shell body defined by first and second shells extending between a leading edge and a trailing edge and an inner spar supporting at least a portion of the shell body, the damping element comprising:

a box configured to be coupled to the inner spar and move relative to the outer shell to dissipate vibrations of the blade, and the box having a greater degree of freedom in a flapwise direction between the first and second shells than in an edgewise direction between the leading and trailing edges.

15. A damping element according to claim 14, wherein the box is defined by first, second, and third surfaces, the third surface being coupled to the inner spar and extending between the first and second surfaces, the first and second surfaces extending in a direction toward the trailing edge and being joined at a location away from the third surface.

16. A damping element according to claim 15, wherein the first and second surfaces of the box are convex.

17. A damping element according to claim 14, wherein at least some of the box is filled with a joint material coupled to both the first and second surfaces, the joint material having a stiffness less than the first and second surfaces and a damping capacity greater than the first and second surfaces.

18. A blade according to claim 1, wherein the damping element comprises:

a first portion coupled to the first shell; and a second portion coupled to the second shell, the first and second portions being configured to move relative to each other and to contact each other during said movement; and a joint material coupling the first portion to the second portion, the joint material having a stiffness less than the first and second portions but a damping capacity greater than the first and second portions.

* * * * *